United States Patent [19]
Tanaka

[11] 4,319,275
[45] Mar. 9, 1982

[54] VERTICAL SYNCHRONIZATION DETECTION SYSTEM AND METHOD

[75] Inventor: Akio Tanaka, San Francisco, Calif.

[73] Assignee: Zenith Radio Corporation, Glenview, Ill.

[21] Appl. No.: 145,153

[22] Filed: Apr. 30, 1980

[51] Int. Cl.³ .............................................. H04N 5/10
[52] U.S. Cl. ................................................... 358/154
[58] Field of Search ........................ 358/153, 154, 158

[56] References Cited
U.S. PATENT DOCUMENTS

| 3,530,238 | 9/1970 | Matarese | 358/158 |
|---|---|---|---|
| 3,619,497 | 11/1971 | Ellis | 358/154 |
| 3,688,037 | 8/1972 | Ipri | 358/158 |
| 3,873,768 | 3/1975 | Klein | 358/155 |
| 3,899,635 | 8/1975 | Steckler et al. | 358/148 |
| 3,925,613 | 12/1975 | Kokado | 358/154 |
| 4,084,187 | 4/1978 | Schlotzhauer | 358/153 |
| 4,097,896 | 6/1978 | Avery | 358/153 |

OTHER PUBLICATIONS

Rzeszewski et al., "A Microcomputer Controlled Frequency Synthesizer for TV", *IEEE Transactions on Consumer Electronics*, vol. CE-24, No. 2, May 1978, pp. 145-152.

Primary Examiner—John C. Martin
Attorney, Agent, or Firm—John H. Coult

[57] ABSTRACT

Disclosed is a microcomputer-controlled system and method for detecting a vertical synchronization pulse extracted from a composite synchronization signal provided to a television receiver. Sync pulse voltage level, period and duty cycle are analyzed in terms of predetermined vertical sync criteria in detecting valid vertical synchronization.

16 Claims, 4 Drawing Figures

VERTICAL SYNCHRONIZATION DETECTION SYSTEM AND METHOD

CROSS REFERENCE TO RELATED APPLICATIONS

This application is related to but in no way dependent upon the following applications which are assigned to the assignee of the present application: Ser. No. 107,732, filed Feb. 19, 1980, entitled "Microcomputer-Controlled One-Step Back Automatic Frequency Control Tuning System," in the name of Peter C. Skerlos; and Ser. No. 164,716, filed June 30, 1980, entitled "AFT-Wide Automatic Frequency Control System and Method," in the name of Akio Tanaka.

BACKGROUND OF THE INVENTION

This invention relates generally to synchronization signal detection in a television receiver, and more particularly relates to a microcomputer-controlled system and method for detecting the presence of valid vertical sync pulses.

The signal received by a television receiver incorporates two primary components, a composite video signal and a composite synchronization signal. The video signal includes picture information such as luminance and chrominance signals. The composite synchronization pulse includes pulse-like signals occurring both at the horizontal and vertical scan rates which are interspersed between the scan interval picture component in the period generally referred to as the retrace interval. In addition, these sync pulse signals coincide in time with blanking signals used to blank out the video display during retrace.

The sync pulse signals are stripped from the blanking signals by means of a sync pulse separator circuit and applied to deflection circuitry in controlling the horizontal and vertical scanning of the television receiver's cathode ray tube. Because the sync pulses possess amplitudes in excess of the picture information signal level, sync separator circuits generally employ an amplitude, or threshold, responsive circuit to separate the sync information from the remainder of the signal. Most sync separators utilize a pulse-clamping technique in which a voltage proportional to sync pulse amplitude is stored as a reference bias. Also utilized is a clipper circuit responsive to the clamp voltage level which conducts only during a selected portion of the sync signal to the exclusion of video signal components. The output of this clipper circuit is then generally amplified and formed into appropriate, limited digital-type signals which are easily utilized in the synchronous driving of deflection circuitry.

Various factors in the video signal transmission environment increase the difficulty of synchronization pulse detection. These factors can produce excessive sync pulse amplitude variations, loss of low or high frequency components, imposition of white noise on the sync signal or the super-position of impulse noise on the incoming sync pulse. All of these phenomena either make sync pulse detection more difficult or increase the possibility of erroneous sync. For example, in a weak electrical field, or one containing a high noise level, vertical sync pulses may become broken up, or cracked, which may result in their non-detection by synchronization circuitry. Also, conventional sync separators require a signal level of at least 25% of the normal sync amplitude. However, with the composite video signal at a level of only 2–3 volts the sync separator circuit must be able to detect sync pulse amplitudes of 200 millivolts or less. This environment places high signal detection operating criteria on vertical synchronization detection circuitry.

One approach to the extraction of a vertical sync pulse from a composite sync signal is disclosed in U.S. Pat. No. 3,925,613. This approach is intended primarily to avoid non-synchronization problems caused by a noisy electrical field resulting in a cracked vertical sync pulse component which, in an extreme case, may be partially lost. The invention described therein involves the broadening of the widths of the input pulses to an extent at least larger than the width of the respective splits between the vertical sync pulses in converting the vertical sync pulse divided by noise-produced splits into a continuous form. Thus, this invention is capable of accurately detecting a sync signal in a noisy environment when the sync signal is present but is equally susceptible to false, or inaccurate, sync in an extremely noisy environment where noise input pulses to the television receiver are close in time.

Another approach to sync pulse extraction is disclosed in U.S. Pat. No. 4,084,187, wherein is described a circuit which establishes the back porch level of the composite video wave form at a first voltage level and establishes the sync signal level at a second voltage level and extracts the latter from the former at a signal level midway between these two voltage levels. The extraction process involves several feedback loops, an AGC amplifier and numerous other amplifiers, comparators and filters which make this approach feasible for only very specialized sync processes. Indeed, the primary intended use of this invention is with video tape recorders where lines during a portion of the vertical timing interval are absent from the video wave form and the video wave form signal level is at the blanking level.

Still other approaches to vertical sync signal recovery from the composite sync signal are disclosed in U.S. Pat. Nos. 3,873,768 and 3,530,238 and 4,097,896. The first of these patents emphasizes and detects the amplitude portion of the vertical sync signal. The second patent is primarily involved with measuring pulse timing in picking the vertical sync pulse off of the composite sync signal. The last approach referred to above, described in U.S. Pat. No. 4,097,896, also involves sync pulse amplitude detection and the generation of the sync signal output when sync pulse amplitude exceeds a predetermined reference voltage level. Still another pulse, or timing, detection approach is disclosed in U.S. Pat. No. 3,619,497, which involves the generation of a vertical sync signal at the field frequency by producing a pulse with a leading edge defined by the trailing edge of the first and a trailing edge defined by the leading edge of the second of the pulses of the vertical synchronizing pulse group.

Therefore, it can be seen from the discussion of the above-referenced patents that the prior art makes use of only one characteristic of the vertical sync pulse, either amplitude or timing, in the vertical synchronization process. The present invention, however, utilizes both characteristics of the vertical sync pulse for sync detection purposes. In addition, a third pulse input, i.e., duty cycle, is utilized for even more accurate detection of the presence of a valid vertical sync input pulse in a television receiver.

OBJECTS OF THE INVENTION

Accordingly, it is an object of the present invention to provide an improved system and process for detecting the presence of vertical synchronization pulses in a signal received by a television receiver.

Another object of the present invention is to provide a microcomputer-controlled vertical sync detection system and method for a television receiver in which several received signal characteristics are sampled and digitally compared to reference parameters in determining the pressure or absence of vertical sync.

Another object of the present invention is to provide a more reliable vertical sync detection system and method for a television receiver capable of detecting and rejecting such sources of false sync as noise inputs, amplitude variations and signal loss.

BRIEF DESCRIPTION OF THE DRAWINGS

The appended claims set forth those novel features believed characteristic of the invention. However, the invention itself, as well as further objects and advantages thereof, will best be understood by reference to the following detailed description of a preferred embodiment taken in conjunction with the accompanying drawings, in which:

DESCRIPTION OF THE PREFERRED EMBODIMENT

Figure 1:
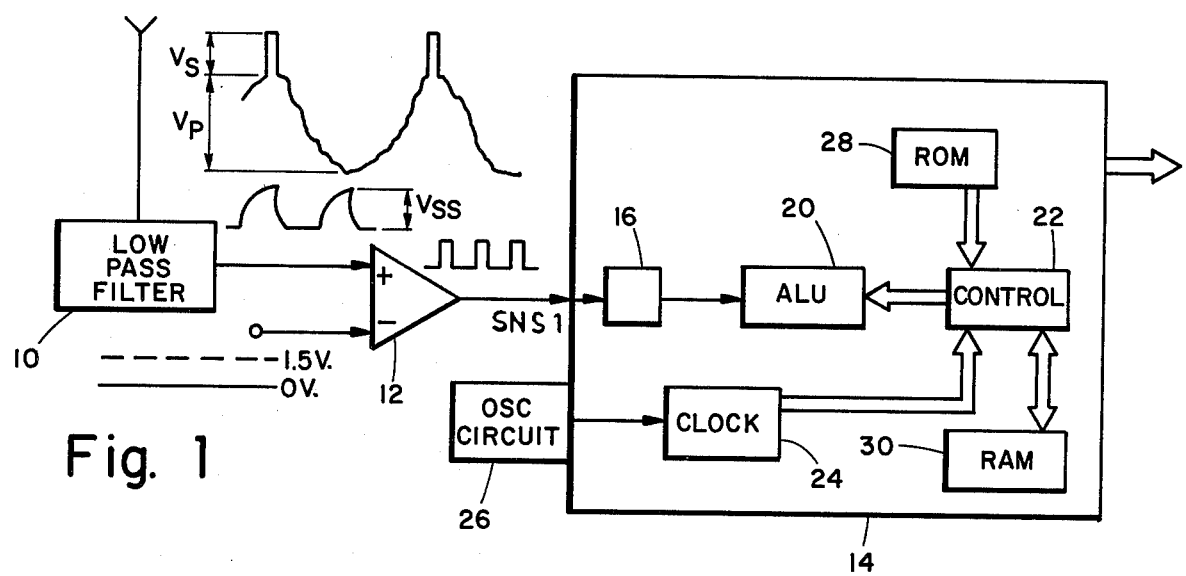
FIG. 1 is a simplified block diagram of a vertical synchronization detector system in accordance with a preferred embodiment of the present invention together with signal wave forms in various portions of the system.

Referring to the block diagram of FIG. 1, there is shown a preferred embodiment of a vertical synchronization detection system and process in accordance with the present invention. An amplitude modulated composite video signal possessing a pedestal, or brightness, level, $V_p$, includes a composite synchronization signal having a voltage level $V_s$ which is provided to the television receiver. The composite sync signal is stripped from the composite video signal by conventional signal processing and passed through a low pass filter 10 to extract the vertical sync signal $V_{ss}$. The vertical sync signal, $V_{ss}$, is then provided to the plus terminal of comparator 12 while a reference 1.5 volt signal is provided to the minus terminal of comparator 12. Comparator 12, in turn, provides a digital output representing vertical sync input pulses greater than 1.5 volts. In this manner, the vertical sync input pulse is threshold-detected and the appropriate drive signal levels for microcomputer 14 are provided. Microcomputer 14 provides vertical sync information storage, decision making logic and signal processing control in providing the appropriate tuning control signal to the television receiver's tuning system (not shown).

An analog-to-digital function is accomplished by comparator 12 in generating a pulse output in accordance with the stripped-off vertical sync signal, $V_{ss}$, exceeding the 1.5 reference voltage. In addition to signal level detection, comparator 12 also provides proper shaping of the input pulse to microcomputer 14. The digital signal enters microcomputer 14 via the Sense One Input at a signal level of approximately five volts. Microcomputer 14 operates at voltage levels of 0 and 5 volts with 5 volts representing a digital logic "1" and 0 voltage representing a digital logic "0". The input pulse is then provided to Sense Flag 16 which is a flip-flop which sets a flag when an input pulse is received. Sense Flag 16 switches from logic zero to logic one upon the receipt of an input pulse and latches there until the data is sampled. The latched output of Sense Flag 16 is sampled and provided to arithmetic logic unit (ALU) 20 which compares the current state of Sense Flag 16 with its preceding state and is capable of sensing changes of state in Sense Flag 16. ALU 20 receives digital control signals from the microcomputer controller 22 and performs the required arithmetic or logic operation. Microcomputer chip timing is provided by means of oscillator circuit 26 on the microcomputer chip 14. Clock generator 24 is driven by oscillator circuit 26, portions of which are located internal and external to microcomputer 14. Clock generator 24 provides the clocking signals necessary to clock microcomputer operations.

Microcomputer 14 is a 4 bit, MOS integrated circuit which includes a ROM 28, a RAM 30, and a controller 22. The microcomputer stores instructions and data, periodically updates the stored data, compares both stored and real-time data and makes decisions based upon these comparisons by means of logic instructions in providing system control. ROM 28 is a mask-generated, factory produced 768×8 bit memory matrix which includes 768 words of 8 bit "bytes." Program instructions and data are stored in ROM 28. The microcomputer operates on a 58 instruction set. Instructions and data are sequentially read from ROM 28 by the microcomputer controller 22 in carrying out program functions. RAM 30 has an X-register, Y-register memory matrix organization for temporary memory storage of 32 words of four bits each. Each bit may be used as a flag to indicate whether a particular event has occurred or the individual bits can be used in combination to form a counter. RAM memory locations are designated by M(X,Y) terminology with words expressed generally in hexadecimal code. The present description involves only those portions and functions of microcomputer 14 which are applicable to the present invention. Additional detailed information regarding the microcomputer chip configuration and operation is contained in the Matsushita Electronics Corporation publication entitled "MN 1400 Series: 4-Bit 1-Chip Microcomputer." In addition, "A Microcomputer Controlled Frequency Synthesizer For TV," IEEE Transactions on Consumer Electronics, Volume CE-24, No. 2, May 1978, by Rzeszewski et al., also includes a detailed description of the characteristics and functioning of the microcomputer in an unrelated tuner-channel selection application.

The manner in which digital signals are processed in the vertical synchronization detector system will now be explained with reference to the flow chart shown in FIG. 2 as it relates to the system block diagram of FIG.

1. In referring to FIG. 2, an oval symbol indicates the start of an operational sequence, a diamond indicates a decision point, and a rectangle indicates the performance of an operation. Presented in FIG. 2 in columns from left to right are ROM addresses utilized, the mnemonic for the ROM address, a flow chart, and a statement, or comments, concerning a particular program step. Table 1 contains the program listing for the flow chart sequence shown in FIG. 2.

If the signal input level to comparator 12 exceeds 1.5 volts, a logic "1" is provided to microcomputer input SNS1 (Sense 1). The signal is coupled to Sense Flag 16 which is a flip-flop either set or not set by the presence or absence of input pulses provided to input SNS1. A valid vertical sync input signal will provide a 60 Hz, 5 volt pulse train to SNS1 with a pulse period of 16.7 milliseconds and a pulse width of approximately 200 microseconds. Sense Flag 16 is latched by a logic "1" input signal. The vertical sync routine is a sub-routine within a larger television receiver tuning program. It is designated by instruction code MPD and is called, or executed, every 2.5 milliseconds. This high rate of vertical sync program execution is necessary to ensure adequate sampling of the vertical sync input signal. Once called by ROM instruction, the vertical sync program senses the status of Sense Flag 16.

comparing the current level with the previous level stored in bit 4 of RAM memory location M(0,14). Table 2 shows the contents of RAM memory locations M(0,14) and M(0,15). The status of Sense Flag 16 is stored in bit 4 of M(0,14). This procedure permits the system to determine whether it has gone high to low or low to high based upon the vertical sync signal input to Sense Flag 16. If Sense Flag 16 has transitioned from low to high level, the program branches to routine VS30 designated by sub-routine (2). This permits RAM 30 to indicate a present high level state in Level Memory (LM) bit one of M(0,14). An X in memory designates no change so the net result of the first operation thus far described is merely to set the Level Memory.

Following the setting of Level Memory, the program resets bits 1-3 in M(0,14). This results in no change in the Level Memory (LM) and the setting of the three bits of the Low Level Counter (LLC) to zero. This permits the system to start keeping track of high level signals while simultaneously counting low level periods during which no input pulse is received. The vertical sync input pulse is detected by comparing a predetermined sequence of high level states with a predetermined sequence of low level states. These predetermined high and low level states are stored in ROM and are limited to two counts maximum for the high level counter and

TABLE 1

```
                  * * * * * * * * * * * * * * * * * * * * *
                  *    ROM1400 ASSEMBLY LIST    *
                  * * * * * * * * * * * * * * * * * * * * *
ADR   OBJ    STMT  . . . . . . . .   SOURCE STATEMENT . . . . . . .         ERR . MSG

474             TIT
             475    *
             476    *
             477    *
0F4   30     478   MPD       LX      0       VSYNC DETECTION
0F5   6E     479             LY      X'E'
0F6   0D     480             L
0F7   3D F1  481             BS1     VS10
0F9   77     482             AND1    7       VSYNC LOW RESET LEVEL MEMORY
0FA   96     483             CI      6
0FB   0A     484             ST
0FC   E3 F9  485             B7      VS20
0FE   81     486   VS40      AI      1       LEVEL PERIOD COUNT
0FF   0A     487             ST
0F0   1F     488             RFT
0F1   D8     489   VS10      TR      8       VSYNC HIGH
0F2   E3 FC  490             B7      VS30    CHECK PREVIOUS LEVEL
0F4   6F     493   VS60      LY      15      VSYNC WAS HIGH
0F5   0D     494             L
0F6   D2     495             TR      2
0F7   E3 FE  496             B7      VS40
0F9   6F     497   VS20      LY      15      VSYNC NOT DETECTED
0FA   BC     498             SM      12      NOT VSYNC OR VSYNC NOT PULSE FLAG
0FB   1F     499             RFT
0FC   B8     500   VS30      SM      8       VSYNC CHANGED TO HIGH,SET LEVEL MEM.
0FD   C7     501             RM      7       RESET LOW LEVEL COUNTER
0FF   6F     502             LY      15
0FF   B9     503             SM      9
100   94     504             CI      4       M(1,D) GT 3?
101   E4 08  505             BNC     VS50
103   0D     506             L               M(1,D) GT 3
104   D4     507             TR      4
105   E2 08  508             BNZ     VS50
107   C8     509             RM      8       VSYNC DETECTED
108   C6     510   VS50      RM      6       RESET VSYNC NOT PULSE FLAG,INIT. CNT.
109   1F     511             RFT
             512    *
             513    *
             514    *
             515    *
```

Figure 2:
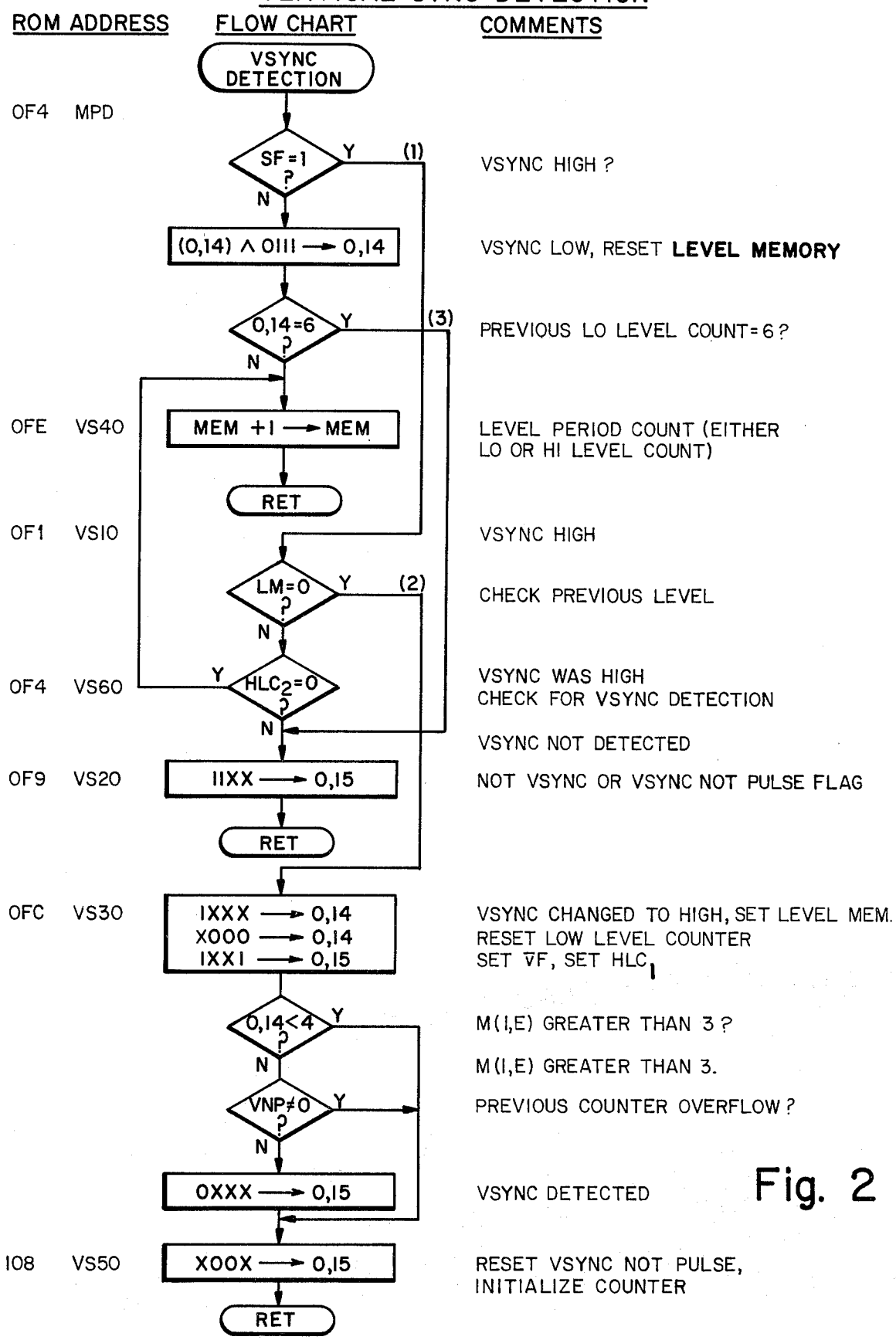
FIG. 2 shows the vertical synchronization detection sequence implemented by the microcomputer.

If Sense Flag 16 is high, or provides an output of logic one, the program branches to routine label VS10, as depicted in FIG. 2 by sub-routine (1). The system then checks the previous memory level of Sense Flag 16 by between four and six counts for the low level counter for detection of a valid vertical sync input pulse train. Thus, only two bits are designated for high level counting while three bits are dedicated to low level counting.

TABLE 2

M(0,14)

| (4) | (3) | (2) | (1) |
|-----|-----|-----|-----|
| LM  | LLC | LLC | LLC |

LM: LEVEL MEMORY
LLC: LOW LEVEL COUNTER.  6 COUNTS MAX.,
 4 COUNTS MIN.

M(0,15)

| (4) | (3) | (2)    | (1)    |
|-----|-----|--------|--------|
| VF  | VNP | $HLC_2$ | $HLC_1$ |

VF: VSYNC FLAG. 0 IF DETECTED. 1 OTHERWISE.
VNP: VSYNC NOT PULSE FLAG. 1 IF LLC OR HLC
 OVERFLOW. 0 OTHERWISE.
HLC: HIGH LEVEL PERIOD COUNTER.
 1 COUNT MAX.

Figure 3:
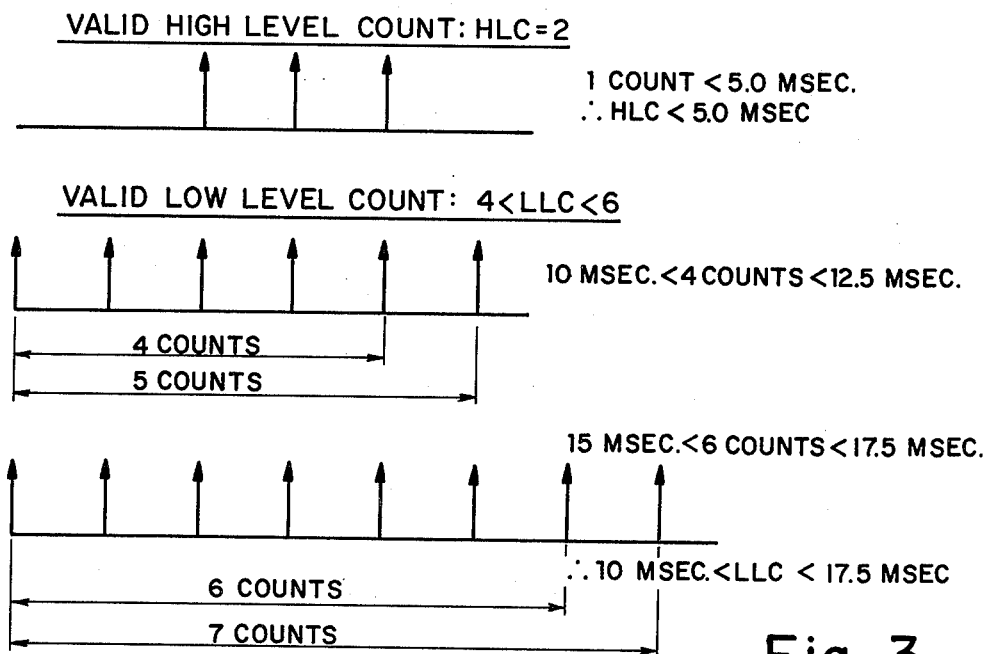
FIG. 3 shows the relationship between the high and low level counters in the microcomputer and the parametric values required for valid vertical synchronization detection.

The relationship between high and low signal levels is shown in FIG. 3 where each count represents 2.5 milliseconds. As shown in FIG. 3, a valid high level signal must be two counts while a valid low level interval must be between four and six counts to verify valid vertical sync detection. Time intervals corresponding to these signal counts are also shown in FIG. 3. Thus, more than two counts on the high level counter indicates invalid vertical sync while more than six counts or less than four counts on the low level counter also indicates invalid vertical sync.

Therefore, at the VS30 routine the Low Level Counter (LLC) has been reset. As shown in Table 2, the Vertical Sync Flag (VF) is located in bit 4 of M(0,15). The vertical sync flag indicates zero if an input pulse is detected and one if no input pulse is sensed. At VS30 the Vertical Sync Flag (VF) and the first bit of the High Level Counter ($HLC_1$) are set to one with High Level Counter two ($HLC_2$) and the Vertical Sync Not Pulse flag (VNP) not reset at this time. The VNP bit is set to one if either the LLC or HLC overflows, otherwise it is set to zero. At this point the program looks at the contents of M(0,14) to see if it is less than four. The program does this indirectly by actually asking if the contents of M(0,14) is greater than three and if the program determines that the contents of M(0,14) is less than four, then vertical sync cannot possibly have been detected so the program branches to VS50 where the Vertical Sync Not Pulse bit and High Level Counter Two ($HLC_2$) are reset. The program then returns to the general microcomputer-controlled tuning program of the television receiver to be recalled in 2.5 milliseconds.

If the contents of M(0,14) is not less than four, then no branch occurs and the program monitors the Vertical Sync Not Pulse flag which will indicate 1 if either the LLC or the HLC has overflowed indicating an invalid vertical sync situation. For example, if the Low Level Counter went up to seven, or beyond, or the High Level Counter went up to three, an illegal vertical sync situation would exist with the Vertical Sync Not Pulse flag monitoring this overflow situation. If an overflow is detected, the program branches to the Exit Point returning to the main program following the reset of the Vertical Sync Not Pulse flag and High Level Counter Two ($HLC_2$). If no overflow occurs, a valid vertical sync signal has been detected and the program then returns to the main tuning program following the reset of the Vertical Sync Flag, the Vertical Sync Not Pulse flag and High Level Counter Two ($HLC_2$). The return of the vertical sync sub-program to the main program following valid vertical sync detection can only occur if the pulse input to the microcomputer exceeds 1.5 volts, the pulse period is within a pre-determined timing range, and the relationship between the duration of the high level pulse and the low level interval satisfies a predetermined duty cycle value. The predetermined period and duty cycle values stored in the microcomputer's ROM correspond to 1 to 2 high and 4 to 6 low levels of the 2.5 msec clock.

Referring back to the VS10 routine, if the Level Memory (LM) was previously 1, the program checks the status of High Level Counter Two ($HLC_2$) at VS60. If $HLC_2$ equals logic one, then the counter's value is too large and the Vertical Sync flag and the Vertical Sync Not Pulse flag are set to one indicating no vertical sync detection with a return to the main program. If $HLC_2$ is zero, the program branches to VS40 where the high level counter is incremented by one followed by an exit from the vertical sync detection program and a return to the main tuning program.

Returning to the initiation of the vertical sync detection sub-program, if the state of Sense Flag 16 is initially low, indicating the vertical sync signal is at a logic "0", the program resets the level memory by performing an AND operation on the contents of M(0,14). Performing this operation on the contents of M(0,14) results in the resetting of the Level Memory bit regardless of the contents of that memory location without altering the contents of the Low Level Counter. This procedure thus clears the Level Memory bit without altering the contents of the Low Level Counter. The program next checks to see if the previous low level count was six and if so, branches to VS20 which provides an automatic vertical sync not detected signal resulting in the exit from the vertical sync detection program to the general tuning program following the setting of the Vertical Sync flag and the Vertical Sync Not Pulse flag in M(0,15). Vertical sync is rejected here because the low level counter exceeded the predetermined limit of six counts. In summary, this sub-routine was executed because an excessive number of low level counts occurred with the decision being made that the vertical sync signal was illegal. This results in the vertical sync detection program terminating with a return to the television receiver tuner program after the Vertical Sync flag and the Vertical Sync Not Pulse flag have been set to logic "1" in order to detect the next incoming vertical sync pulse. In order to detect a valid vertical sync pulse the Low Level Counter must indicate the absence of a sync pulse from 10 milliseconds through 17.5 milliseconds while an acceptable high level count is limited to less than 5 milliseconds. The worst case duty cycle for valid vertical sync is less than $33\frac{1}{3}\%$. If the previous low level count is not six, the program does not branch to VS10 but rather increments the Low Level Counter (LLC) by one and exits the vertical synchronization detection sub-program. This procedure simply increments the Low Level Counter in RAM location M(0,14).

Figure 4:
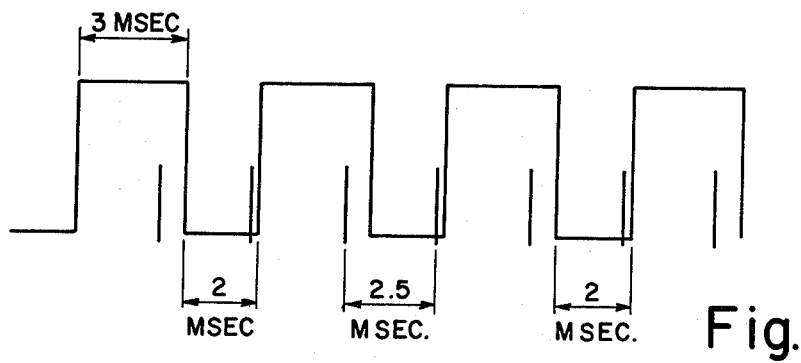
FIG. 4 is a pulse diagram showing the relationship between the timing of the vertical synchronization detection system as represented by three millisecond clocking pulses and the frequency at which the vertical sync detection subroutine is periodically initiated in the overall television receiver tuning program.

FIG. 4 shows the relationship between vertical sync detection system timing and the frequency at which the vertical sync detection sub-routine is initiated in the general television receiver tuning program. Because an asynchronous relationship exists between detection system timing and the sequential initiation of the vertical sync detection sub-routine, ambiguities may be produced in duty cycle detection and measurements. It is for this reason that measurement tolerances have been incorporated in the detection program. These tolerances, i.e., pulse width<5 milliseconds for high level pulse count and 10.0 milliseconds<pulse width<17.5 milliseconds for low level count duration, compensate for the inherent inaccuracies of the system due to the asynchronous relationship between program timing and the execution period of the program itself. Improved accuracy may be obtained by decreasing the magnitude of the sampling period.

What has been shown is a microcomputer controlled system for detecting a vertical synchronization pulse extracted from a composite synchronization signal received by a television receiver. The reliability and accuracy of sync signal detection is enhanced by using signal amplitude, pulse period and duty cycle to verify the presence of a valid vertical sync signal. The sync signal is sampled at a high rate to ensure accurate signal detection with signal parameters selected to minimize the possibility of false vertical sync.

While particular embodiments of the invention have been shown and described, it will be obvious to those skilled in the art that changes and modifications may be made without departing from the invention in its broader aspects and, therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective against the prior art.

I claim:

1. A system for detecting a vertical synchronization pulse in a composite synchronization signal in a video signal, including first signal processing means for separating said vertical synchronization pulse from said composite synchronization signal and said video signal, said system comprising:
   first comparator means coupled to the output of said first signal processing means for receiving a vertical signal input from said signal processing means, said comparator means having a predetermined threshold signal level to produce an output pulse when said vertical signal input level exceeds said predetermined threshold signal level;
   low level and high level counter means coupled to the output of said first comparator means for counting the time intervals said output pulse is low and high, respectively;
   second comparator means coupled to said low level and high level counter means for comparing said measured low and high level counts with a predetermined range of low and high level counts and for comparing the combination of said low and high level counts with a predetermined range of low and high level count combinations for one period of said output pulse; and
   signal generation means coupled to and responsive to said second comparator means for producing a vertical synchronization detection signal when said measured low and high level counts and said combination thereof are within said predetermined ranges of said low and high level counts and said combination thereof.

2. A system according to claim 1 wherein said first comparator means is a differential amplifier in which the vertical signal input is compared to a reference voltage level with said first comparator means producing said output pulse when the vertical signal input voltage level exceeds said reference voltage level.

3. A system according to claim 1 further including:
   data memory means for storing said predetermined ranges of low and high level counts and combination thereof; and
   second signal processing means coupling said data memory means to said second comparator means for reading said predetermined ranges from said data memory means for comparison with said measured values in said second comparator means.

4. A system according to claim 1 wherein said second comparator means compares the duty cycle of said output pulse with a predetermined duty cycle range and said second comparator means compares the period, or frequency, of said output pulses with a predetermined range of periods, or frequencies.

5. A microcomputer controlled system for detecting a vertical synchronization pulse in a composite synchronization signal of a video signal provided to a television receiver, including signal processing means for separating said vertical synchronization pulse from said composite synchronization signal and said video signal, said system comprising:
   comparator means coupled to the output of said signal processing means for receiving a vertical signal input from said signal processing means and coupled to a reference signal source to produce an output pulse when the level of said vertical signal input exceeds said reference signal level;
   digital latch means for receiving said output pulse and for sensing a change in the state of said output pulse signal;
   clock means coupled to said latch means for generating binary signals representing change of state time intervals of said latch means caused by variations in said vertical signal input;
   data memory means coupled to said digital latch means for storing the generated binary signals representing said change of state time intervals corresponding to low and high states of said output pulse signal and for storing predetermined reference values for the period and duty cycle of said output pulse signal;
   accumulator—ALU means connected to said data memory means for reading out of said data memory means and for comparing said binary signals representing latch means change of state time intervals with said predetermined values of the period and duty cycle of said output pulse signal; and
   signal generation means responsive to said accumulator—ALU means for generating a vertical synchronization detection signal when said measured change of state time interval signals equal said predetermined values of output pulse signal period and duty cycle.

6. A system according to claim 5 wherein said comparator means is a differential amplifier in which the vertical signal input voltage level is compared to a reference voltage level for producing an output pulse when the vertical signal input voltage level exceeds said reference voltage level.

7. A system according to claim 5 wherein the measured change of state time interval combination of low and high states of said latch means represents the period of said vertical signal input and the high state of said latch means divided by said combination of low and high states represents the duty cycle of said vertical signal input.

8. A system according to claim 5 wherein said reference signal level applied to said comparator means is 1.5 volts.

9. A system according to claim 8 wherein said predetermined value of said duty cycle of said output pulse signal is less than $33\frac{1}{3}\%$ and the frequency of said vertical synchronization signal is $60\pm10$ Hz.

10. A method for detecting a vertical synchronization pulse in the composite synchronization signal of a video signal comprising the steps of:

separating said vertical synchronization pulse from said composite synchronization signal and said video signal;

comparing the amplitude of said vertical synchronization pulse with a predetermined threshold signal level;

generating an output pulse when the amplitude of said vertical synchronization pulse exceeds said predetermined threshold signal level;

measuring the time intervals said output pulse is low and high and the combination thereof;

comparing said measured low and high level time intervals of said output pulse and the combination thereof with a predetermined range of low and high signal levels and combinations thereof, respectively; and generating a vertical synchronization detection signal when said measured low and high level time intervals and said combination thereof are within said predetermined ranges of said low and high level signal levels and combinations thereof, respectively.

11. The method of claim 10 further including the steps of:

storing said predetermined ranges of low and high signal levels and combinations thereof in a data memory of a microcomputer; and reading said stored, predetermined ranges of low and high signal levels and combinations thereof from said data memory for comparison with said measured low and high levels and combinations thereof, respectively, of said output pulse.

12. The method of claim 10 wherein the comparison of said measured and predetermined low and high level time intervals and combinations thereof of said output pulse includes the comparison of the period, or frequency, and the duty cycle of said output pulse with predetermined values of output signal period, or frequency, and duty cycle, respectively.

13. The method of claim 12 wherein said predetermined range of said duty cycle is less than $33\frac{1}{3}\%$ and said predetermined range of the frequency of said output pulse is $60\pm10$ Hz.

14. The method of claim 10 wherein said signal amplitude comparison step includes comparing the amplitude of said vertical synchronization pulse with a reference voltage level resulting in the generation of said output pulse if the amplitude of said vertical synchronization pulse exceeds said reference voltage level.

15. The method of claim 14 wherein said reference voltage level is 1.5 volts.

16. A method for detecting a vertical synchronization pulse in the composite synchronization signal of a video signal using a microcomputer including a data memory in which the stored predetermined ranges of pulsed signal period and duty cycle comprising the steps of:

separating said vertical synchronization pulse from said composite synchronization signal and said video signal;

comparing the voltage amplitude of said vertical synchronization pulse with a reference voltage level;

generating an output pulse when the voltage amplitude of said vertical synchronization pulse exceeds said reference voltage level;

measuring the period and duty cycle of said output pulses;

recalling said predetermined ranges of pulsed signal period and duty cycle from said data memory and comparing said measured period and duty cycle with said respective predetermined period and duty cycle value ranges; and generating a vertical synchronization detection signal when said measured output pulse period and duty cycle are within said predetermined ranges of said pulsed signal period and duty cycle, respectively.

* * * * *